United States Patent [19]

Hayashi

[11] Patent Number: 4,955,978
[45] Date of Patent: Sep. 11, 1990

[54] MICROSCOPE BASE ILLUMINATOR

[75] Inventor: George Hayashi, San Jose, Calif.

[73] Assignee: Swift Instruments, Inc., San Jose, Calif.

[21] Appl. No.: 352,929

[22] Filed: May 17, 1989

[51] Int. Cl.$^5$ .............................................. G02B 21/06
[52] U.S. Cl. ...................................... 350/523; 362/216
[58] Field of Search ............... 350/523, 525, 526, 528; 362/216

[56] References Cited

U.S. PATENT DOCUMENTS

| 3,634,681 | 1/1972 | Johnson et al. | 362/216 |
| 3,933,408 | 1/1976 | Reinert | 350/523 |
| 4,598,343 | 7/1986 | Sorrell | 362/216 |
| 4,771,370 | 9/1988 | Lowe et al. | 362/216 |

Primary Examiner—Jon W. Henry
Attorney, Agent, or Firm—Fish & Richardson

[57] ABSTRACT

A illuminator base for illumination of a microscope specimen from below the specimen includes a fluorescent lamp bulb for generation of illuminating light on a viewing axis. The fluorescent lamp bulb has at least two arms, each having an active volume within a glass wall. The arms are disposed with each active volume generally tangent to the viewing axis. A line intersecting the viewing axis and the axes of lamp arms lies at an acute angle to the viewing axis. Preferably the lamp bulb is u-shape, the angle is about 40° and 50°, and light transmitted by the lamp arms along the viewing axis is substantially without shadow.

12 Claims, 3 Drawing Sheets

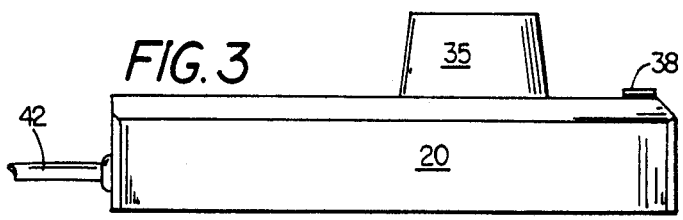
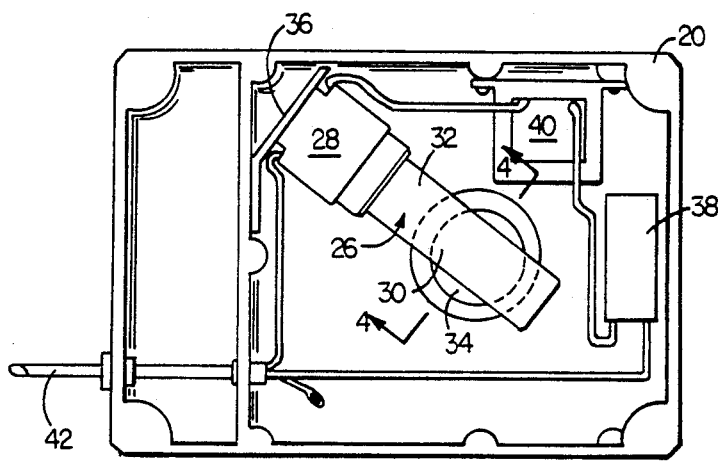

MICROSCOPE BASE ILLUMINATOR

The invention relates to illuminators for microscopes, and particularly for illuminators for lighting specimens by transmission of light from the microscope base.

Microscope base illuminators are employed to provide a constant source of artificial light for viewing specimens on the microscope platform. It has been known in the past to employ tungsten or halogen bulbs for microscope illumination, but at higher levels of brightness, required, e.g. with binocular or teaching body microscopes or 100X objective or phase optics, excessive heat may be generated in the base, making it necessary to provide ventilation. The tungsten bulb must also be used with a blue filter to remove the yellow cast of the generated light, which further reduces the level of brightness available. It has also been known to provide illumination from a remote source by means of a fiber optic bundle, and it has been known to provide top lighting, e.g. for viewing opaque specimens, by means of a fluorescent illuminator, e.g. a ring bulb or a pair of straight bulbs located adjacent the objective, above the microscope platform.

SUMMARY OF THE INVENTION

According to the invention, a microscope illuminator base for illumination of a microscope specimen from below the specimen comprises a fluorescent lamp bulb means for generation of illuminating light on a viewing axis.

In preferred embodiments, the fluorescent lamp bulb means comprises at least two fluorescent lamp bulb arms, e.g. of a u shape bulb, each arm comprising an active volume within a glass wall, the arms disposed with each volume generally tangent to the viewing axis, preferably a line intersecting the viewing axis and the axes of the lamp arms lies at an acute angle to the viewing axis, e.g. of the order of between about 40° and 50°, and preferably of about 45°. Preferably, light transmitted by the lamp arms along the viewing axis is substantially without shadow.

Thus there is provided a microscope base illuminator providing a high brightness level of transmitted light, without generation of an excessive level of heat, by means of a fluorescent light source, the light source preferably being a U-shape bulb with two arms disposed in a manner to substantially eliminate shadow on the specimen.

These and other features and advantages will be seen from the following description of a presently preferred embodiment, and from the claims.

PREFERRED EMBODIMENT

We first briefly describe the drawings.

FIG. 2 is a bottom plan view of the base illuminator of FIG. 1, while FIG. 3 is a side view of the illuminator and FIG. 4 is a section view of the fluorescent lamp taken at the line 4—4 of FIG. 2; and FIG. 5 is a somewhat diagrammatic cross sectional view of the fluorescent lamp of FIG. 1, while

Figure 1:
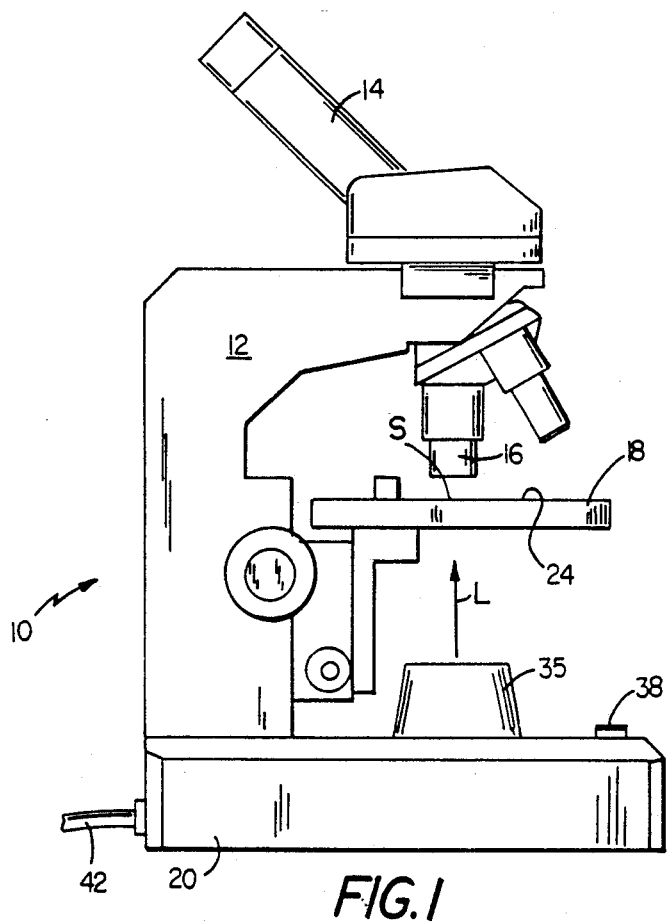
FIG. 1 is a side view of a typical microscope having a fluorescent lamp base illuminator of the invention.
Figure 4:
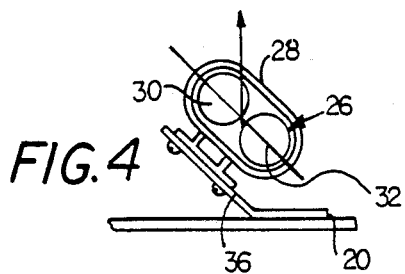

Referring to FIG. 1, a typical microscope 10 consists of body 12, eyepiece 14, view optics 16, adjustable platform 18 and base 20. Disposed in the base is a fluorescent illuminator 22 of the invention, providing transmitted light, L, for viewing of a specimen, S, disposed on the surface 24 of the platform.

Referring to FIGS. 2 and 3, the illuminator in base 20, in the preferred embodiment, consists of a u-shape fluorescent bulb 26, e.g. an OSRAM® Dulux 5 watt U.S.A. bulb, as sold by Osram Corporation U.S.A. of Montgomery, N.Y., disposed in a socket 28. The lamp socket is mounted on bracket 36, the bulb lamp arms 30, 32 being disposed relative to the base condenser lens 34 in condenser lens housing 35 in a manner to transmit light upon the specimen substantially without shadow, as described more fully below. Switch 38 actuates the lamp via ballast 40 powered by means of electrical cord 42.

Figure 5:
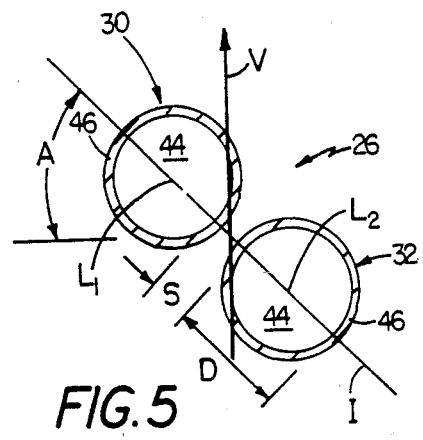

Referring now to FIG. 5, the fluorescent bulb 26 consists of an active volume 44 surrounded by a cylindrical glass wall 46. According to the invention, the arms 30, 32 of the fluorescent lamp 26 are disposed in a manner to cause the inner active volumes of each lamp arm to lie generally tangent to the viewing axis, V, with the axes $L_1$, $L_2$ of the respective lamp arms intersecting a line, I, that intersects the viewing axis, V, at an acute angle, A. For example, for a lamp having the particular ratio of bulb inner diameter, D, to inner diameter spacing, S, of that described above, angle A is of the order of about 40° to 50°, and preferably of the order of about 45°. It has been found that if the lamp 26 is placed at a smaller angle, A, to the viewing axis, with the upper lamp arm 30 overlapping the lower lamp arm 32, an undesirable shadow or band of less brightness is created in the light transmitted for viewing the specimen. Similarly, if the lamp arms are disposed at a greater angle, A, with the active volumes spaced from the viewing axis, an undesirable shadow or band of less brightness is again created in the illumination light.

Figure 6:
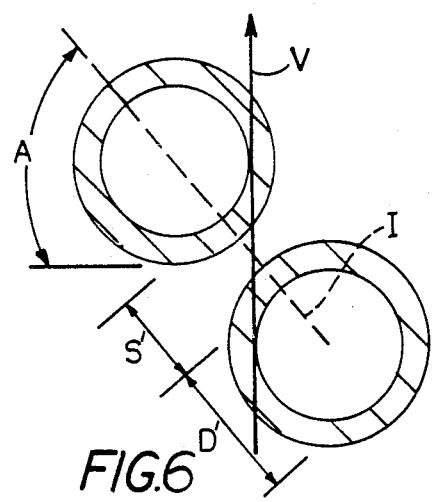
FIG. 6 is a similar view of another lamp arranged according to the invention.

Other embodiments are with the following claims. For example, a fluorescent lamp having a single arm might be employed in certain circumstances, e.g. where a relatively lower level of brightness is sufficient, or two separate fluorescent bulbs may be disposed side-by-side. In the latter case, and for u-shape or other multi-arm bulbs having a different ratio of D:S, other angles, A, would be required, e.g. as seen in FIG. 6.

What is claimed is:

1. A microscope illuminator base for use with a microscope comprising a microscope body, a specimen viewing platform and an eyepiece and viewing optics defining a microscope viewing axis through said eyepiece and viewing optics for visual inspection of a microscope specimen disposed upon said platforms, said microscope illuminator base disposed beneath said platform, relative to said viewing optics, for generation of light for illumination of a microscope specimen disposed upon said platform, said microscope illuminator base comprising a fluorescent lamp means for generation of illuminating light on said viewing axis, said fluorescent lamp means comprising at least two fluorescent lamp arms, each said lamp arm comprising a glass wall having an inner surface, with an active illuminating volume defined within said glass wall by said inner surface, said lamp arms disposed with the respective inner surfaces of said glass walls defining said active illuminating volumes disposed on opposite sides of and generally tangent to said microscope viewing axis, and a line intersecting said viewing axis and the axes of said lamp arms lying at an acute angle to said viewing axis.

2. A microscope comprising:
a microscope illuminator base,
a microscope body,
a specimen viewing platform, and
an eyepiece and viewing optics defining a microscope viewing axis through said eyepiece and viewing optics for visual inspection of a microscope specimen disposed upon said platform,
said microscope illuminator base disposed beneath said platform, relative to said viewing optics, for generation of light for illumination of a microscope specimen disposed upon said platform, said microscope illuminator base comprising a fluorescent lamp means for generation of illuminating light on said viewing axis, said fluorescent lamp means comprising at least two fluorescent lamp arms, each said lamp arm comprising a glass wall having an inner surface, with an active illuminating volume defined within said glass wall by said inner surface, said lamp arms disposed with the respective inner surfaces of said glass walls defining said active illuminating volumes disposed on opposite sides of and generally tangent to said microscope viewing axis.

3. The microscope illuminator base of claim 1 or 2 further comprising means for positioning said lamp arms within said illuminator base, relative to said viewing axis, in a manner whereby light transmitted by said lamp arms along said viewing axis is substantially without shadow.

4. The microscope illuminator of claim 1 or 3 wherein said fluorescent lamp bulb means is a u-shape fluorescent lamp bulb.

5. The microscope illuminator base of claim 1 or 2 wherein said angle is between 40° and 50°.

6. The microscope illuminator base of claim 5 wherein said angle is about 45°.

7. A microscope illuminator base for use with a microscope comprising a microscope body, a specimen viewing platform and an eyepiece and viewing optics defining a microscope viewing axis through said eyepiece and viewing optics for visual inspection of a microscope specimen disposed upon said platform,
said microscope illuminator base disposed beneath said platform, relative to said viewing optics, for generation of light for illumination of a microscope specimen disposed upon said platform, said microscope illuminator base comprising a fluorescent lamp means for generation of illuminating light on said viewing axis, said fluorescent lamp means comprising at least two fluorescent lamp arms, each said lamp arm comprising a glass wall having an inner surface, with an active illuminating volume defined within said glass wall by said inner surface, said lamp arms disposed with the respective inner surfaces of said glass walls defining said active illuminating volumes disposed on opposite sides of and generally tangent to said microscope viewing axis.

8. The microscope illuminator base of claim 7 wherein a line intersecting the viewing axis and the axes of said lamp arms lies at an acute angle to said viewing axis.

9. The microscope illuminator base of claim 8 wherein said angle is between 40° and 50°.

10. The microscope illuminator base of claim 9 wherein said angle is 45°.

11. The microscope illuminator base of claim 7 further comprising means for positioning said lamp arms within said illuminator base, relative to said viewing axis, in a manner whereby light transmitted by the active illuminating volumes of said lamp arms along said viewing axis is substantially without shadow.

12. The microscope illuminator of claim 7 wherein said fluorescent lamp bulb means is a u-shape fluorescent lamp bulb.

* * * * *